United States Patent [19]

Kokabu et al.

[11] Patent Number: 4,841,315

[45] Date of Patent: Jun. 20, 1989

[54] EXPOSURE APPARATUS

[75] Inventors: Misao Kokabu; Hitoshi Nakamura; Takashi Fujimura, all of Mobara; Nobuyasu Hayashi, Chiba, all of Japan

[73] Assignees: Hitachi Ltd.; Hitachi Device Engineering Co., Ltd., Tokyo, Japan

[21] Appl. No.: 224,768

[22] Filed: Jul. 27, 1988

[30] Foreign Application Priority Data

Sep. 18, 1987 [JP] Japan ................................ 62-232256

[51] Int. Cl.[4] ............................................ G03B 41/00

[52] U.S. Cl. ............................................ 354/1; 430/23

[58] Field of Search ........................ 354/1; 430/23, 24; 356/121, 222

[56] References Cited

U.S. PATENT DOCUMENTS 3,482,495 12/1969 Jameikis .................................. 354/1

4,206,986 6/1980 Kotoyori et al. ........................ 354/1

4,630,909 12/1986 Forker et al. ........................... 354/1

FOREIGN PATENT DOCUMENTS 43-28553 12/1968 Japan .

47-31264 8/1972 Japan .

*Primary Examiner*—A. A. Mathews

*Attorney, Agent, or Firm*—Antonelli, Terry & Wands

[57] ABSTRACT

An exposure apparatus of the present invention for forming a fluorescent screen over the inner surface of the panel of a color cathode ray tube has a drive device capable of automatically aligning a short-arc mercury-vapor lamp to hold the position of the center axis within a required exposure accuracy, whereby the position of the arc center of the short-arc mercury-vapor lamp is displaced toward the center axis of the panel to correct arc variations depending upon a lighting period of the short-arc mercury-vapor lamp.

3 Claims, 3 Drawing Sheets

EXPOSURE APPARATUS

BACKGROUND OF THE INVENTION

1. Field of the Invention

The present invention relates to exposure apparatus of the type that employs a short-arc mercury-vapor lamp as an exposure light source for formation of the fluorescent screen of a color cathode ray tube.

2. Description of the Prior Art

As disclosed in Japanese Patent Examined Publication No. 47-31264, a spot light source device in which a secondary light source is obtained from a linear or rod-shaped light source has in the past been used as an exposure apparatus for formation of the fluorescent screen of a color cathode ray tube, and then a very high pressure mercury-vapor lamp is used as a primary light source.

Japanese Patent Examined Publication No. 43-28553 proposes an exposure apparatus employing a very high pressure mercury-vapor lamp of a so-called short-arc (electrode-load) type in which a cathode and an anode are oppositely disposed in an oval bulb charged with mercury vapor.

Such a short-arc mercury-vapor lamp which is used in the exposure apparatus has the following problem. Although the required exposure accuracy (the allowable offset amount of the arc center of the mercury-vapor lamp with respect to the center axis of the panel) is typically approximately 0.1 mm, the consumption rate of the emission end of the cathode of the mercury-vapor lamp varies by 0.1 mm/24 hr for an initial lighting period of up to about 100 hours and, subsequently, by 0.02 mm/24 hr after about 100 hours. As a result, the arc length of the mercury-vapor lamp increases in one direction and an error may occur in the position of each phosphor dot, and this adversely affects the configuration of the phosphor dots on the fluorescent screen of the panel.

In order to solve these problems, it has thus far been necessary that while an operator is looking through a viewfinder incorporated in a lamp house which accommodates the short-arc mercury-vapor lamp, he manually operates a micrometer head to perform fine alignment of the mercury-vapor lamp and correct the exposure accuracy of the arc center. However, the above-described setting has required a very long period of time.

SUMMARY OF THE INVENTION

It is therefore an object of the present invention to provide an exposure apparatus employing a short-arc mercury-vapor lamp, for formation of the fluorescent screen of a color cathode ray tube, in which the position of the arc center thereof can be automatically aligned and held within a required exposure accuracy for correction of variations which occurs in the arc center of the mercury-vapor lamp with the passage of light time.

To achieve the above and other objects, in accordance with the present invention, there is provided an exposure apparatus employing a short-arc mercury-vapor lamp which apparatus is provided with drive means for causing the arc center of the short-arc mercury-vapor lamp to be displaced toward the center axis of a panel in correspondence with the amount of variation of the position of that arc center.

In the present invention, the drive means automatically align the short-arc mercury-vapor lamp so that the offset amount between the center axis of the panel and the arc center may be maintained within a predetermined exposure accuracy during displacement of the arc center.

Therefore, there is no need for a manual alignment operation otherwise necessary for correcting the variation of the arc center of the short-arc mercury-vapor lamp. As a result, both productivity and the exposure accuracy are improved, so that it is possible to prevent the occurrence of off-spec products and to eliminate the difference in performance between individual products. In consequence, various excellent effects can be achieved, such as the improvement of the quality of products.

The above and other objects, features and advantages of the present invention will become apparent from the following description of the preferred embodiments thereof, taken in conjunction with the accompanying drawings.

DESCRIPTION OF THE PREFERRED EMBODIMENTS

Preferred embodiments of the present invention will be described below in detail with reference to the accompanying drawings.

Figure 1:
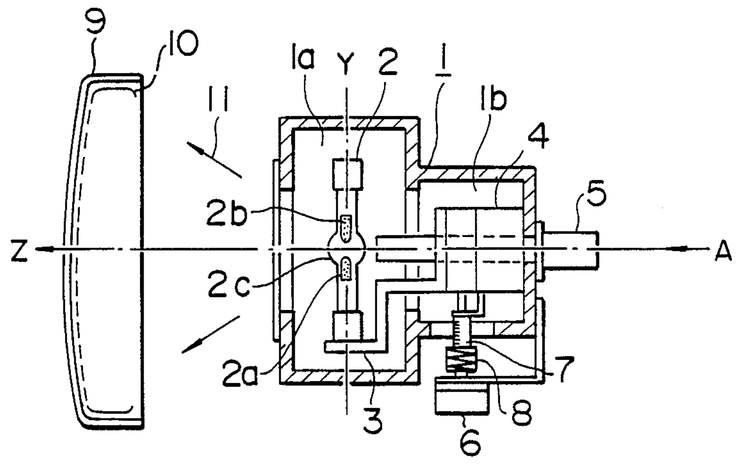
FIG. 1 is a schematic cross-sectional view, with portions omitted for the sake of simplicity, of one embodiment of an exposure apparatus according to the present invention.

Referring to FIG. 1 which is a diagrammatic cross-sectional view of one preferred embodiment of an exposure apparatus of the present invention, the exposure apparatus is shown as being applied to the formation of a fluorescent screen over the inner surface of the panel of a color cathode ray tube. As illustrated, the forward space of a lamp house 1 is formed into a chamber 1*a*, and a short-arc mercury-vapor lamp 2 and a mercury-vapor lamp support 3 are disposed in the chamber 1*a*. The short-arc mercury-vapor lamp 2 includes an anode 2*a* serving as an opposing electrode, a cathode 2*b* serving as an electron emission electrode and an approximately spherical bulb 2*c*, and the anode 2*a* and the cathode 2*b* are vertically opposed to each other in the bulb 2*c* charged with mercury-vapor. The mercury-vapor lamp 2 is supported on the mercury-vapor lamp support 3 at one end thereof. A rearward chamber 1*b* is integral with the forward chamber 1*a* of the lamp house 1. In the rearward chamber 1*b*, the other end of the mercury-vapor lamp support 3 is supported by an X-Y-Z (three-dimensional) stage (movable base) 4 and a view-finder 5 is disposed on the center axis (Z axis) of the mercury-vapor lamp 2. A pulse motor 6 adapted to cause the X-Y-Z stage 4 to move along any of the X, Y and Z axis is coupled to the X-Y-Z stage 4 by way of a micrometer head 7 and a coupling 8 at a location below the rearward chamber 1*b*. In the illustrated example, however, the pulse motor 6, the micrometer head 7 and the coupling 8 are, for the purpose of illustration, arranged to move the X-Y-Z stage 4 along the Y axis. A panel 9 having an inner surface coated with a photosensitive film is disposed in front of the lamp house 1, although not shown, with a correction lens and a filter interposed between the panel 9 and the lamp house 1. The panel 9 into which a shadow mask 10 is fitted is located with its center axis coincident with the axis of the viewfinder 5. Reference numeral 11 denotes ultraviolet rays radiated from the short-arc mercury-vapor lamp 2.

Figure 2:
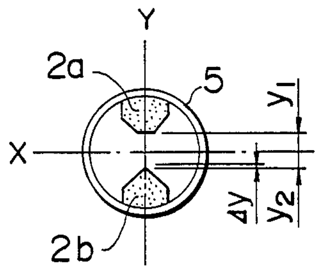
FIG. 2 is a view schematically showing the field of view as viewed through the viewfinder of FIG. 1 in the direction of an arrow A.

FIG. 2 is an illustration of the visual field which is viewed through the viewfinder of FIG. 1 in the direction indicated by an arrow A. The inverted visual image of the anode 2*a* and the cathode 2*b* which are vertically opposed to each other in the short-arc mercury-vapor lamp 2 is optically transmitted through the viewfinder 5.

In the exposure apparatus having the above-described arrangement, in order to hold the exposure accuracy within approximately 0.1 mm as described previously, the micrometer head 7 is automatically shifted in the Y-axis direction by the driving of the pulse motor 6 to effect alignment of the short-arc mercury-vapor lamp 2 under the condition of an approximately 0.025-mm shift at intervals of about 50 hours for an initial lighting period of up to about 100 hours and, subsequently after that hours, an approximately 0.03-mm shift at intervals of about 72 hours. As shown in FIG. 2 which is drawn in a simplified form for the sake of better understanding, a variation Δy with time in the position of the emission end of the cathode 2*b* of the short-arc mercury-vapor lamp 2 is corrected so as to make the distance y1 between the center line of the viewfinder 5, that is, the center axis of the panel 9 and the opposing end of the anode 2*a* substantially coincident with the distance y2 between the center line of the viewfinder 5 and the emission end of the cathode 2*b*. In other words, the micrometer head 7 is rotated by the driving of the pulse motor 6 to cause the X-Y-Z stage 4 which supports the mercury-vapor lamp support 3 to move in the Y-axis direction, thereby correcting the position of the arc center in the short-arc mercury-vapor lamp 2 under the above-described condition.

In this case, it is preferable to set the position of the arc center to a desired position since the position of the luminance peak of the light spot is biased toward the cathode 2*a* of the short-arc mercury-vapor lamp 2.

Figure 3:
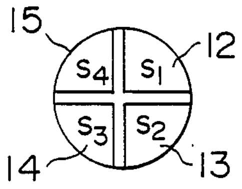
FIG. 3 is a schematic front elevational view of a split-type PIN photodiodes for sensing the position of an arc center.

Although the above embodiment is arranged such that the short-arc mercury-vapor lamp 2 is automatically shifted by a predetermined amount at predetermined time intervals, the present invention may be carried out with the use of another embodiment such as that shown in FIG. 3.

In the automatic alignment carried out in the embodiment shown in FIG. 3, split-type PIN photodiodes 12, 13, 14 and 15 for sensing the position of the arc center are incorporated as a sensor means in the viewfinder 5, and the pulse motor 6 is controlled by correction means that corrects the position of the arc center (which will be described below) on the basis of signals from the respective photodiodes in order to displace the position of the arc center of the short-arc mercury-vapor lamp 2 toward the center axis of the panel 9.

Figure 4A:
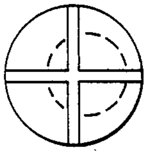
FIG. 4A is a view showing the horizontal deviation of an arc spot on the photodiode shown in FIG. 3.
Figure 4B:
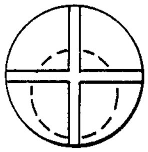
FIG. 4B is a view similar to FIG. 4A, but showing the vertical deviation of the arc spot on the photodiode shown in FIG. 3.
Figure 5:
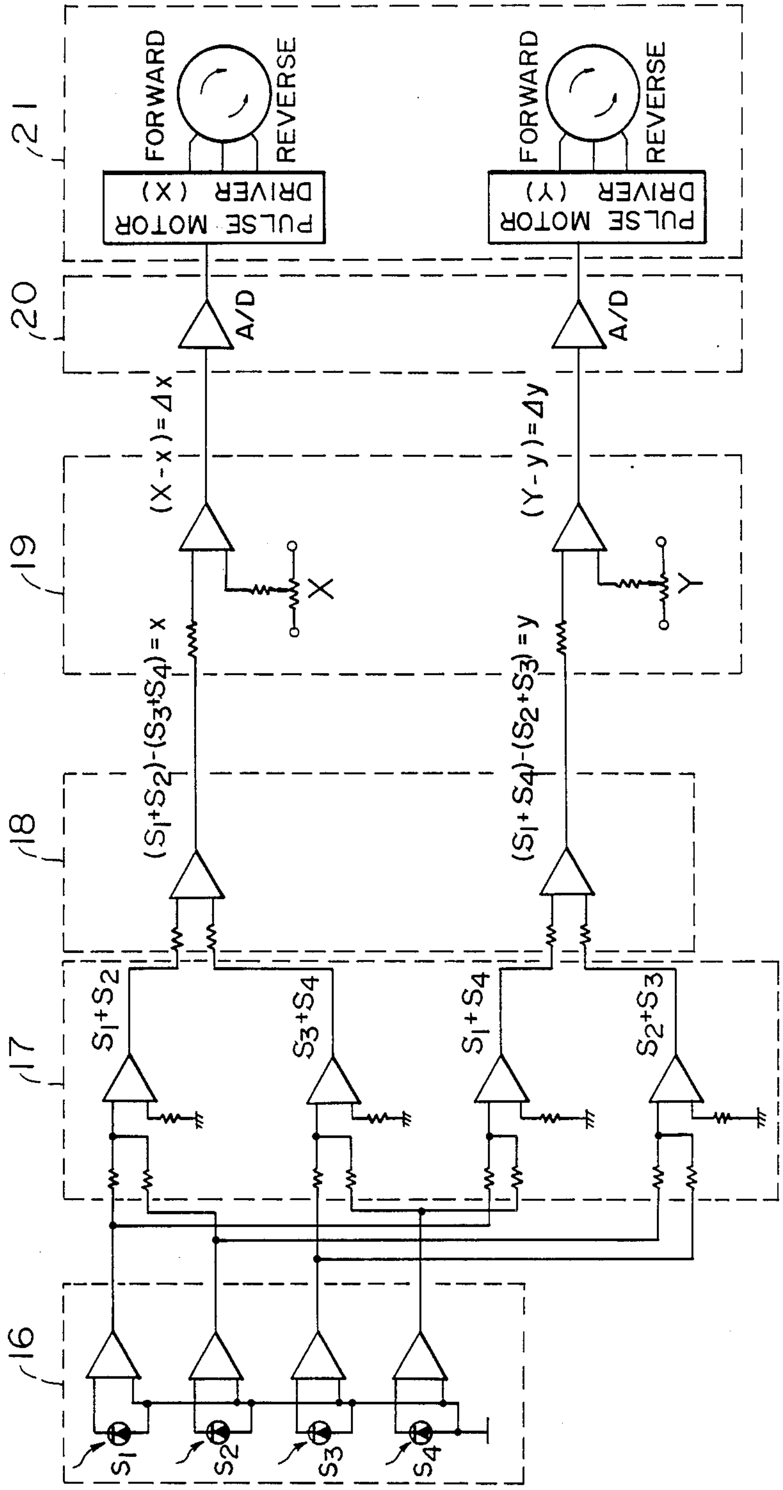
FIG. 5 is a circuit diagram of a control circuit for controlling the driving of a pulse motor for causing displacement of a short-arc mercury-vapor lamp.

The X-Y-Z stage 4 can be shifted in either of the X and Y directions on the basis of signals from the photodiodes 12, 13, 14 and 15. Therefore, the following description refers to the displacement relative to the X-axis and Y-axis directions. The position of the light spot on the photodiodes 12, 13, 14 and 15 is, for example, as shown in FIG. 4A which shows a deviation in the X-axis direction or as shown in FIG. 4B which shows a deviation in the Y-axis direction. Signals from respective sensing portions s1, s2, s3 and s4 are processed in the control circuit of FIG. 5 which serves as the correction means for correcting the position of the arc center. The signals from the photo-sensing circuit 16 composed of the sensing portions s1, s2, s3 and s4 etc. are subjected to addition in the addition circuit 17 to provide four signals representative of addition results $S_1+S_2$, $S_3+S_4$, $S_1+S_4$, and $S_2+S_3$ of the signals from two sensing portions. These signals $S_1+S_2$, $S_3+S_4$, $S_1+S_4$, and $S_2+S_3$ from the addition circuit 17 are supplied to a first differential circuit 18 which provides a signal difference x with respect to the X-axis direction and a signal difference y with respect to the Y-axis direction. The output signals x and y are supplied to a second differential circuit 19 for outputting difference signals Δx and Δy which respectively represent the difference between the signal X and a desired value X and the difference between the signal y and a desired value Y, the desired signals X and Y being set values indicative of the position of the center of the panel 9. These differential circuits 18 and 19 serve as arithmetic means which compute the amount of displacement of the position of the arc center with respect to the set value. The second differential circuit 19 outputs the difference Δx between the desired value X and the signal x and the difference Δy between the desired value Y and the signal y to a pulse motor drive circuit 21, that is, means for correcting the position of the arc center through an analog-to-digital circuit 20, thereby driving the pulse motor 6.

In the above-described control circuit, if it is desired to displace the position of the arc center of the short-arc mercury-vapor lamp 2 toward the center of the panel 9, the position of the light spot with respect to the photodiodes 12, 13, 14 and 15 needs only to be changed by driving the pulse motor 6 so that the aforesaid signal differences Δx and Δy always reach zero.

In the above-described construction, the position of the arc center of the short-arc mercury-vapor lamp 2 is automatically aligned and held within the required exposure accuracy during exposure.

The above description refers to the exposure apparatus for forming the fluorescent screen of the panel of the color cathode ray tube. However, it is evident that the present invention can be applied to the formation of the fluorescent screen of a color display tube (CDT), a color picture tube (CPT) or any other color cathode ray tube (CRT).

It will be appreciated from the foregoing that, in accordance with the present invention, the short-arc mercury-vapor lamp is automatically aligned by the drive means for displacing the short-arc mercury-vapor lamp toward the center axis of the panel in correspondence with the variation of the arc center of the short-arc mercury-vapor lamp, whereby there is no need for manual alignment operation otherwise necessary for correcting the variation of the arc center. In consequence, both the productivity and the exposure accuracy are improved, so that it is possible to prevent the occurrence of off-spec products and to eliminate the difference in performance between individual products.

What is claimed is:

1. An exposure apparatus for use in forming a fluorescent screen on the inner surface of the panel of a color cathode ray tube, comprising:

a short-arc mercury-vapor lamp having an approximately spherical bulb charged with mercury vapor in an enclosed manner, an electron-emission electrode, and an opposing electrode disposed in opposition to said electron-emission electrode, said electrodes being spaced apart from each other along the center axis of said bulb by a predetermined distance so that an arc is produced between said electrodes; and drive means for causing said short-arc mercury-vapor lamp to be displaced toward the center axis of said panel in correspondence with the variation of the arc center of said short-arc mercury-vapor lamp.

2. An exposure apparatus according to claim 1, wherein said drive means causes said short-arc mercury-vapor lamp to be automatically displaced by a predetermined amount at set intervals of time.

3. An exposure apparatus according to claim 1, wherein said drive means comprises correction means for correcting the position of said arc center, said correction means including means for sensing the position of said arc center; means for computing the amount of displacement of said position of said arc center with respect to a set position of said arc center; and means for shifting said position of said arc center so as to reduce said amount of displacement.

* * * * *